(12) United States Patent
Yanka

(10) Patent No.: US 10,724,214 B2
(45) Date of Patent: Jul. 28, 2020

(54) THERMAL EXPANSION PROTECTION ASSEMBLY

(71) Applicant: Jones Stephens Corp., Moody, AL (US)

(72) Inventor: Anthony Joseph Yanka, Moorestown, NJ (US)

(73) Assignee: Jones Stephens Corp., Moody, AL (US)

( * ) Notice: Subject to any disclaimer, the term of this patent is extended or adjusted under 35 U.S.C. 154(b) by 93 days.

(21) Appl. No.: 16/221,820

(22) Filed: Dec. 17, 2018

(65) Prior Publication Data

US 2020/0191288 A1 Jun. 18, 2020

(51) Int. Cl.
*E03B 7/09* (2006.01)
*D06F 39/08* (2006.01)
*F16K 17/00* (2006.01)
*E03C 1/02* (2006.01)

(52) U.S. Cl.
CPC .............. *E03B 7/095* (2013.01); *D06F 39/08* (2013.01); *D06F 39/081* (2013.01); *E03C 1/021* (2013.01); *F16K 17/003* (2013.01); *Y10T 137/698* (2015.04)

(58) Field of Classification Search
CPC ...... D06F 39/08; D06F 39/081; D06F 39/088; Y10T 137/698; E03C 1/021; E03C 1/023; E03B 7/095
See application file for complete search history.

(56) References Cited

U.S. PATENT DOCUMENTS

| | | | | |
|---|---|---|---|---|
| 4,564,249 | A | * | 1/1986 | Logsdon ................. D06F 39/08 312/229 |
| 5,279,319 | A | | 1/1994 | Fidelman |
| 6,076,545 | A | * | 6/2000 | Cooper .................. A62C 35/68 137/360 |
| 6,129,109 | A | | 10/2000 | Humber |
| 6,148,850 | A | * | 11/2000 | Kopp ...................... D06F 39/08 137/356 |
| 6,155,286 | A | | 12/2000 | Geary |
| 7,270,144 | B2 | * | 9/2007 | Minnick ............... B05C 5/0216 137/360 |

* cited by examiner

*Primary Examiner* — Kevin F Murphy
(74) *Attorney, Agent, or Firm* — Lucas & Mercanti, LLP

(57) ABSTRACT

A pressure relief assembly for providing thermal expansion protection to plumbing lines in a water distribution system for a home or business having a clothes washing machine wherein the water supply valve or valves and the drain connection for the washing machine are provided in a washing machine box mounted in a wall cavity, the assembly comprising a water pressure relief valve connected within the washing machine box to a washer supply line before the washer supply valve with the drain line from the pressure relief valve extending to the drain opening in the washing machine box. Optionally, the washer water supply valve is also in fluid communication with a water hammer arrestor within the washing machine box.

25 Claims, 4 Drawing Sheets

THERMAL EXPANSION PROTECTION ASSEMBLY

FIELD OF THE INVENTION

The invention relates generally to an apparatus for relieving the excessive build-up of water pressure in plumbing lines caused by the expansion of water when its temperature rises due to heating. More particularly this invention relates an improved apparatus for relieving such water pressure build-up in the plumbing lines of a home or business having a clothes washing machine wherein the water supply valve or valves and the drain connection for the washing machine are provided in a washing machine box mounted in a wall cavity.

BACKGROUND

Modern hot water heaters apply intense heat to water in a tank thereby raising the temperature of the water in the tank. Raising the temperature of water causes it to expand which increases the pressure in the plumbing system serviced by the water heater. Such pressure increases cause deformation of the water heater tank and introduce harmful stresses to a plumbing system.

A common solution to the problem of thermal expansion of water in plumbing systems is to install a bladder containing pressure relief tank in communication with the hot water heater. Such pressure relief tanks contain compressible air within their tanks to afford a volume into which thermally expanding water can move and thereby prevent excessive increases of pressure in the plumbing system. Unfortunately, pressure relief tanks require dedicated piping and structural support, are often installed improperly as their air charge pressure must be adjusted to match the supplied water pressure and are subject to failure due to age and the high temperatures which they experience.

To prevent catastrophic damage to a water heater from over-pressuring, water heaters are commonly provided with a water pressure relief valve which is set to vent water when the pressure in a heater reaches a set level, typically 120 p.s.i. When the pressure in the water heater exceeds the relief valve's set point, the relief valve opens and hot water leaks onto the floor adjacent to the water heater creating an undesirable mess.

A presently available device for alleviating this problem is a water pressure relief valve connected within the water storage tank of a toilet wherein the pressure relief valve is preset to exhaust water into the toilet tank when the water pressure in the supplying plumbing system exceeds a set pressure which is lower than the set pressure of the hot water heater's relief valve, such as between 80 to 90 p.s.i. The problem with this system is that the mechanism is relatively expensive as this pressure relief valve must be adapted for a unique coupling or connection situation within the toilet water tank. In addition, this device cannot be easily or securely connected because the water lines in and to the toilet tank are narrow gauge tubing.

It is a principal object of the present invention to provide a water pressure relief apparatus which is inexpensive to manufacture and simple to install in a location which requires no new plumbing lines and no displacement of existing appliances.

SUMMARY OF THE INVENTION

It is common today to make the connections to clothes washing machines in a washer box which in mounted to wall studs within a wall covered with sheetrock. Washer boxes present a neat appearance since the water supply lines and washer drain line connect to the washer box behind sheetrock within the wall. A washer box also enables a clothes washer installation to take up less space because the hot and cold water supply pipes and the drain pipe required by the washing machine are within the wall. U.S. Pat. Nos. 6,129,109 and 6,155,286 are hereby incorporated by reference to explain the operation and function of washer boxes.

The present invention relates generally to a pressure relief apparatus and assembly for providing thermal expansion protection to plumbing lines in a water distribution system in a home or business which conveniently mounts within a standard washer box. The pressure relief apparatus of the invention is an integral unit which combines a clothes washer water supply shut-off valve with a thermal expansion pressure relief valve in a manner which enables the whole apparatus to fit within a washer box and to be installed simply by connecting a single fitting on the apparatus to a washing machine water supply line in the same way as would be done if only a washer shut-off valve were to be mounted within the washer box. In this way the benefits of adding a thermal expansion pressure relief valve to a plumbing system are achieved without additional labor beyond what would be required to connect a water shut-off valve to the water supply in a washer box. Accordingly, significant labor savings are achieved with the invention. Additionally, because the component parts of the apparatus are fitted together welded, brazed, glued or otherwise connection under factory conditions the water tightness of the apparatus can be assured to a higher degree than would be the case with an in-field assembly.

Preferably, the pressure relief/washer water supply apparatus of the invention is provided with an in-wall mountable washer box in which the apparatus is mounted. The in-wall mountable washer box defines an enclosure for making water supply and water drain connections to a washing machine. The washer box has four side walls, a rear wall and an open face for making water connections to a washing machine. The washer box is optionally equipped with brackets to facilitate its being mounted to a wall stud. The washer box has at least one water supply opening and at least one water drain opening in its side walls. The drain opening is the side wall which is at the bottom of the washer box when it is mounted within the wall. The opening or openings for the water supply line or lines can be in any side wall of the washer box but are preferably in the sides of the washer box which form either its top or bottom when it is mounted for operation within a wall because water supply lines to a clothes washing machine are commonly run vertically.

While a clothes washing machine can operate with only a single water supply comprising either cold or hot water, or a premixed combination of cold and hot water, it is preferred in practice and in this invention to have both cold and hot water supply lines. It is further preferred that the washer box of the invention have water supply openings for both cold and hot water. The drain opening of the washer box of the invention can be located between the cold and hot supply lines or to either the left or right of adjacent supply line openings. It is only required that the washer box of the invention have a single water supply opening and a single drain line opening. When the supply box of the invention has only a single supply line opening, the drain opening can be positioned to either the left or the right of the supply line opening. Where a washer box of the invention has only a single water supply opening or where it has two supply line openings and only a single water supply line is connected to the washer box, a second water line to the clothes washer can be provided in a different washer box or otherwise connected separately to the clothes washing machine.

The pressure relief apparatus of the invention has a water service connection end which is preferably equipped with a connection fitting which facilitates quick connection to the type of water supply line running to the clothes washer. The connection fitting can be selected from the variety of such fittings known in the plumbing trade, including—compression fittings, sleeve fittings and threaded fittings, and can be made from any of the materials used in the plumbing trade, including brass, copper, plastic, iron and steel.

The connection fitting is followed by a plumbing tap having a first fluid entry port which is connected to and in fluid communication with the connection fitting, a second fluid exit port which is opposed to the fluid entry port and a third transverse fluid port. A washing machine water supply/shut-off valve is fixedly mounted on and in fluid communication with the exit port of said plumbing tap. A water pressure relief valve is connected to and in fluid communication with the third port of the plumbing tap. As is customary in plumbing field, the pressure relief valve has a fluid entry port which exposes the mechanism of the relief valve to the pressure in the plumbing system, a valve mechanism which opens when the pressure on the valve exceeds a pre-set value and a drain port to which fluid from the plumbing system is discharged when the pressure relief valve opens. When the pressure in the plumbing system drops to the relief valve's set point, the valve closes and ceases to discharge fluid. Relief valves which are suitable for use in the invention are sold by Princeton International Company of Taipei, Taiwan, the Watts Regulators Co. and Sioux Chief Mfg. Co., Inc.

The washing machine supply/shut-off valve and the pressure relief valve of the invention can be connected directly to the plumbing tap or connected to it by way of a fluid conduit such as a length of pipe or tubing, it being important only they be in fluid communication with the plumbing tap and positioned with respect to the tap such that the pressure relief/shut-off valve apparatus fits within the confines of the washer box. It will further be appreciated that the apparatus of the invention can be assembled from readily available plumbing fittings such as a plumbing compression fitting, a plumbing tee or wye, a washer valve and a pressure relief valve, or specially fabricated as one or more composite parts. To achieve the principal objective of the invention, the plumbing tap, washer valve and pressure relief valve are factory connected by welding, brazing and/or gluing and furnished as a unitary piece which minimizes in-field assembly and installation.

A drain line runs from the pressure relief valve to the drain opening in the washer box. The drain opening in the washer box is connected to a waste water line in the residence or business. The relief valve drain line is a low-pressure line and is in service only when excess pressure in the plumbing system causes the relief valve to open and discharge water to the drain. The drain line can be made from a wide variety of materials, including flexible plastic or copper tubing. The drain line is connected to the relief valve drain port with a fitting, such as for example a compression fitting, a sleeve fitting or a threaded fitting. The relief valve drain line may be but is not necessarily an integral part of the pressure relief apparatus since it is not subjected to the pressure of the plumbing system.

In a preferred embodiment of the invention, the relief valve is connected to the plumbing tap, which may be a plumbing tee or wye, by a section of tubing or pipe. This enables the relief valve to be located in a position which is adjacent to the washer shut-off valve and aligned over the washer box's drain opening whereby the relief valve drain line can be run substantially vertically to the drain opening.

In further preferred embodiment of the invention, a water hammer arrestor of conventional design is mounted in fluid communication with the plumbing tap or the washer water supply valve. Suitable water hammer arrestors are sold by Princeton International Company of Taipei, Taiwan, the Watts Regulators Co. and Sioux Chief Mfg. Co., Inc. of Peculiar, Mo. The water hammer arrestor minimizes vibration in the lines of a plumbing system when the flow of water into a washing machine is interrupted as the washing machine goes through its various clothes washing cycles. The water hammer arrestor is positioned relative to other parts of the present invention to fit within the confines of the washer box.

In another preferred embodiment of the invention, the pressure relief valve of the invention is operatively installed on or in fluid communication through a pipe or tube with the transverse port of a plumbing tee, the washer supply valve and water supply line are connected to the opposed ports of the plumbing tee and a water hammer arrestor is mounted on the side of the water supply valve which is opposed the plumbing tee. In such case, the water hammer arrestor is fluid communication with the water supply through a channel in the washer supply valve. In this embodiment of the invention, the pressure relief valve is positioned generally above the washer box's drain opening and a drain line runs from the pressure relief valve to the washer box drain opening. This embodiment of the invention is space efficient and facilitates fitting all the required components within the confines of the washer box. As with the other embodiments of this invention, the plumbing connection to the water service, the plumbing tee, the tubing or pipe running from the plumbing tee to the relief valve, the connection of the tubing or pipe to the relief valve and the mount of the water hammer arrestor on the washer supply valve are factory made with appropriate brazing, welding, gluing or other affixation means to provide an integral composite apparatus which needs only be inserted into the washer box and attached to a water supply line to the washing machine.

In accordance with the invention, the connection to the washing machine water supply lines can be made either within the washer box—in the case of a supply line which is sized to extend through a water supply opening in the washer box, or beneath the washer box in the case of a water supply line which terminates below the washer box wherein the connector of extends through the washer box's supply opening and connects to the water service below the washer box.

With all embodiments of the invention when excessive pressure occurs in a plumbing system equipped with the relief valve apparatus of the invention, water is vented from relief valve to the relief valve drain line and flows to the drain opening in the washer box and then to the clothes washer drain line mounted thereon in conventional fashion, thereby preventing the undesirable release of water from the pressure relief valve found on modern hot water heaters.

DETAILED DESCRIPTION

Figure 1:
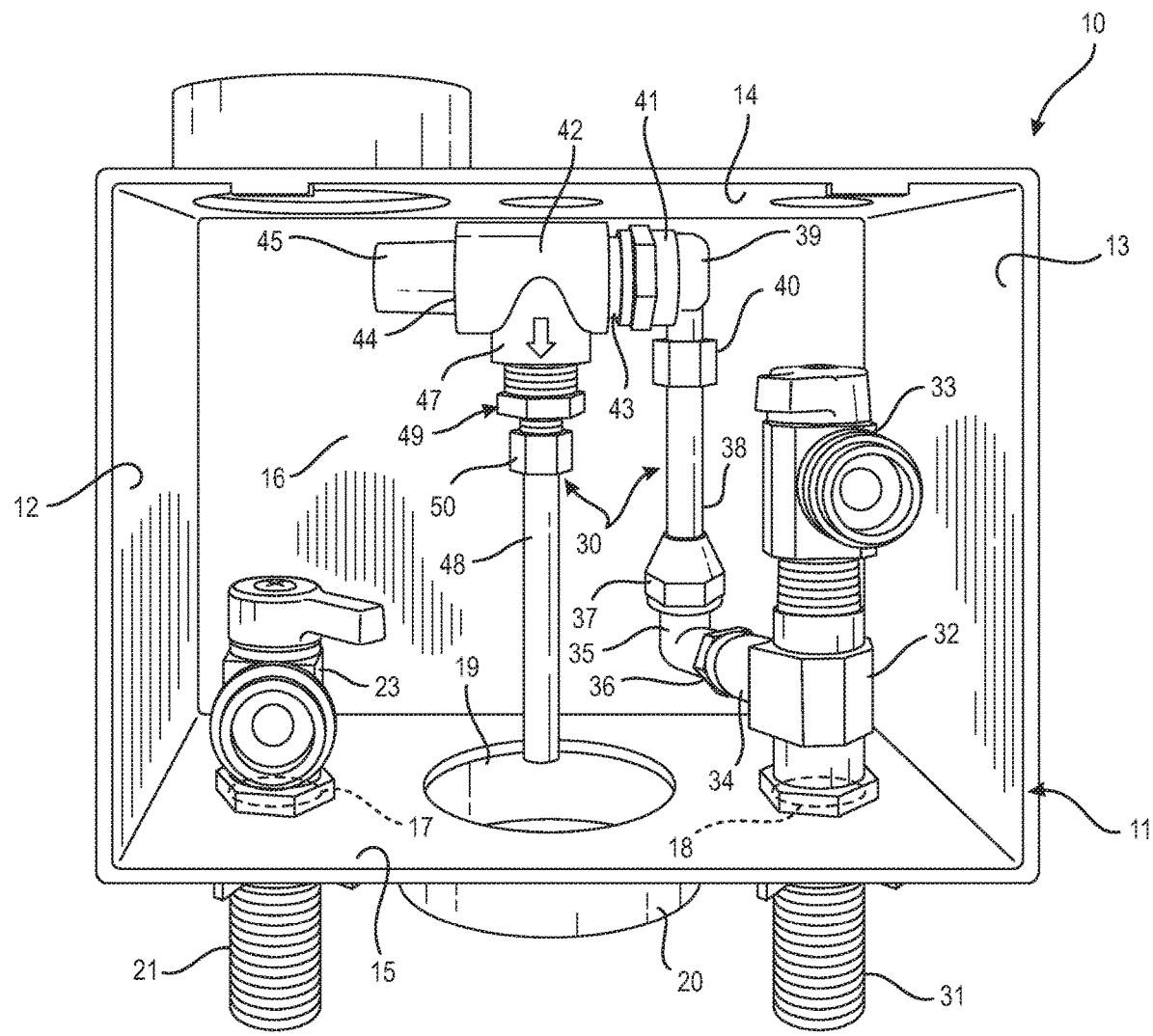
FIG. 1 is a partially exploded front view of a thermal expansion protection assembly according to the present invention with the washer box having a drain opening positioned between two water supply openings, each with a water supply line.

A thermal expansion protection assembly 10 of the invention is shown in FIG. 1. Assembly 10 includes in-wall mountable washer box 11. Washer box 11 has lateral side walls 12 and 13, top and bottom side walls 14 and 15, rear wall 16, and an open face for making water connections to a washing machine. Washer box 11 has hot water supply opening 17, cold water supply opening 18 and drain opening 19, all in bottom wall 15. The underside of drain opening 19 has drain sleeve 20 for connection to a household waste water line which is not shown.

Pressure relief apparatus 30 is contained within washer box 11. Apparatus 30 has water service connector 31 comprising a threaded pipe for connection to a washer cold water supply line which is not shown. In other embodiments of the invention water service connector 31 can be a compression connector, a sleeve or other plumbing line connector. Apparatus 30 and all other embodiments of the pressure relief apparatus of the invention can be installed on either the cold or hot water service. Connection to the cold water service is preferred because the service life of a pressure relief valve can be shortened by repeated operation with hot water. Water service connector 31 is connected to plumbing tap 32, which in the depicted embodiment is a plumbing tee fitting. In other embodiments of the invention, plumbing tap 32 could be a wye fitting or a fitting with two transverse ports, one of which runs to a relief valve and the other to a water hammer arrestor. The hot water supply to the washing machine is connected to hot water supply valve 23 which is connected to the building water service with hot water service connector 21. Hot water service connector 21 is a threaded fitting, but could be a compression fitting, sleeve fitting or other connector.

The end of plumbing tap 32 which is opposed to water service connector 31 is connected to washer water supply valve 33. Transverse port 34 on plumbing tap 32 connects to tap elbow fitting 35 at tap elbow entry 36. Elbow fitting 35 directs the flow of water from transverse port 34 in an upward direction. Tap elbow exit 37 connects to relief valve feed tube 38 which provides a fluid path to relief valve elbow 39. Relief valve elbow 39 connects to feed tube 38 at relief elbow entry 40. The opposite end of relief valve elbow 39 connects to relief valve tee 42 at relief elbow exit 41.

Relief valve tee 42 has opposed relief tee entry port 43 and relief tee valve port 44. In the depicted embodiment of the invention, relief valve actuator 45 is mounted on relief tee exit port 44. Relief valve actuator 45 closes relief valve transverse port 47 to fluid flow when the pressure in the plumbing system is below the set-point of relief valve actuator 45.

When relief valve actuator 45 experiences water pressure in excess of its set-point, it opens and discharges water through relief tee transverse port 47 until the pressure in the plumbing system is reduced to the set-point of relief valve actuator 45. Relief valve transverse port 47 is oriented in a downward direction and is positioned to be above draining opening 19 in washer box 11. Drain line 48 is connected to relief valve transverse port 47 by threaded reduction fitting 49 and compression fitting 50. Drain line 48 carries water released by relief valve actuator 45 to drain opening 19.

While the component parts of pressure relief apparatus 30 are depicted with treaded connections, within the spirit of the invention and this disclosure they are preferably connected permanently by brazing, welding or gluing, or fabrication in a unitary casting requiring no connection.

Figure 2:
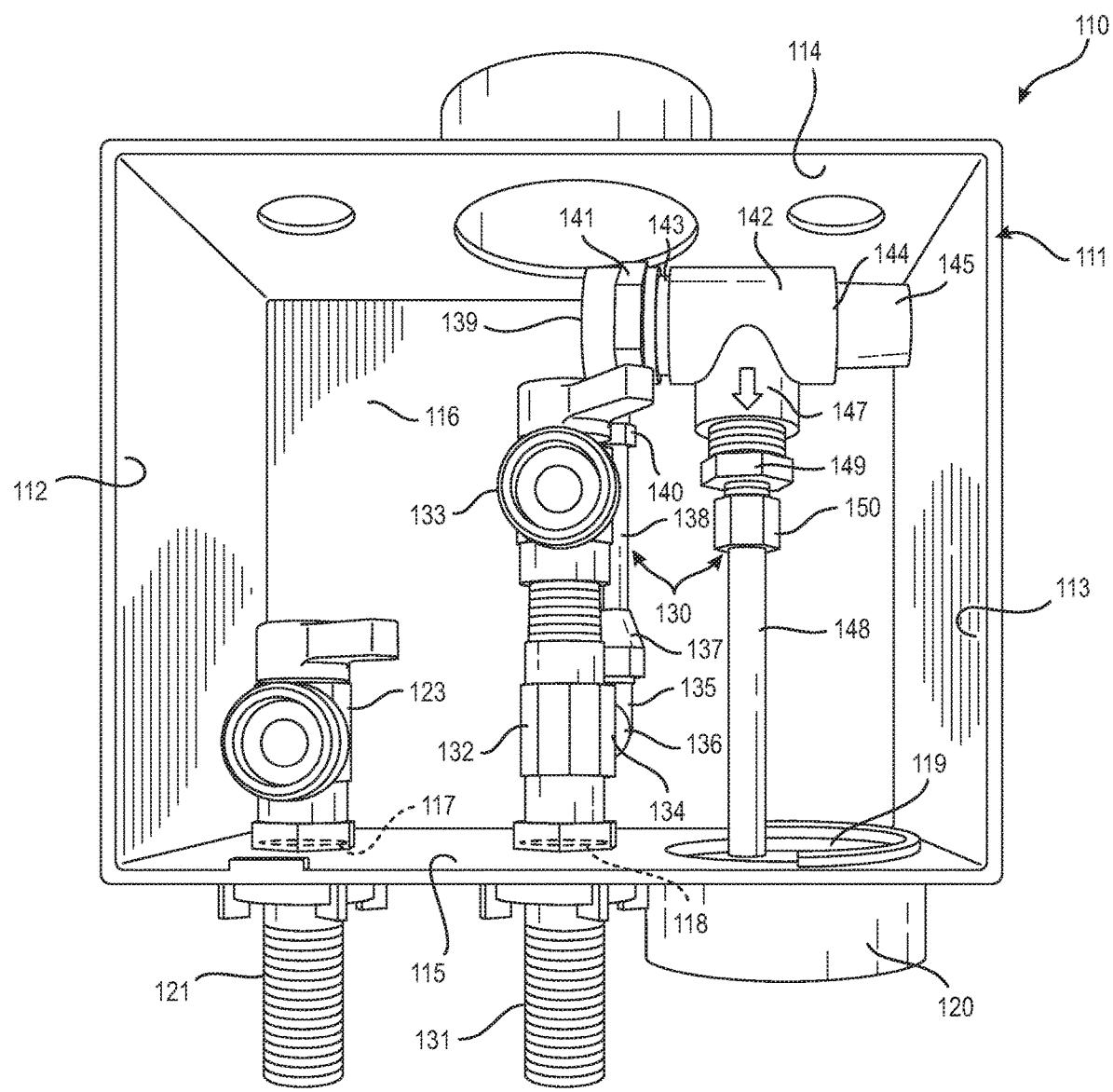
FIG. 2 is a partially exploded perspective view of a thermal expansion protection assembly according to the present invention with the washer box having a drain opening positioned laterally to the right of two adjacent water supply openings, each with a water supply line.

A second embodiment of the invention wherein drain opening 119 is positioned to the right of hot water supply opening 117 and cold water supply opening 118 is shown in FIG. 2. Thermal expansion protection assembly 110 is of the same general construction as assembly 10 other than with respect to the location of the water supply openings in washer box 111. Washer box 111 has lateral side walls 112 and 113, top and bottom side walls 114 and 115, rear wall 116, and an open face for making water connections to a washing machine. Washer box 111 has hot water supply opening 117, cold water supply opening 118 and drain opening 119, all in bottom wall 115. The underside of drain opening 119 has drain sleeve 120 for connection to a household waste water line which is not shown.

Pressure relief apparatus 130 is contained within washer box 110. Apparatus 130 has cold water service connector 131 comprising a threaded pipe for connection to the washer cold water supply line which is not shown. In other embodiments of the invention water service connector 131 can be a compression connector, a sleeve or other plumbing line connector. Water service connector 131 is connected to plumbing tap 132, which in the depicted embodiment is a plumbing tee fitting. The hot water supply to the washing machine is provided by hot water supply valve 123 which is connected to the building water service with hot water service connector 121. Hot water service connector 121 is a threaded fitting, but could be a compression fitting, sleeve fitting or other connector.

The end of plumbing tap 132 which is opposed to water service connector 131 is connected to washer water supply valve 133. Transverse port 134 on plumbing tap 132 connects to tap elbow fitting 135 at tap elbow entry 136. Elbow fitting 135 directs the flow of water from transverse port 134 in an upward direction. Tap elbow exit 137 connects to relief valve feed tube 138 which provides a fluid path to relief valve elbow 139. Relief valve elbow 139 connects at one end to feed tube 138 and its other end to relief elbow entry 140. The opposite end of relief valve elbow 139 connects to relief valve tee 142 at relief elbow exit 141.

Relief valve tee 142 has opposed relief tee entry port 143 and relief tee valve port 144. Relief valve actuator 145 is mounted on relief tee valve port 144. Relief valve actuator 145 closes relief valve transverse port 147 to fluid flow when the pressure in the plumbing system is below the set-point of relief valve actuator 145

When relief valve actuator 145 experiences water pressure in excess of its set-point, it opens and discharges water through relief tee transverse port 147 until the pressure in the plumbing system is reduced to the set-point of relief valve actuator 145. Relief valve transverse port 147 is oriented in a downward direction and is positioned to be above draining opening 119 in washer box 111. Drain line 148 is connected to relief valve transverse port 147 by threaded reduction fitting 149 and compression fitting 150. Drain line 148 carries water released by relief valve actuator 145 to drain opening 119.

While the component parts of pressure relief apparatus 130 are depicted with treaded connections, within the spirit of the invention and this disclosure they are preferably permanently connected by brazing, welding or gluing, or fabrication in a unitary casting requiring no connection.

Figure 3:
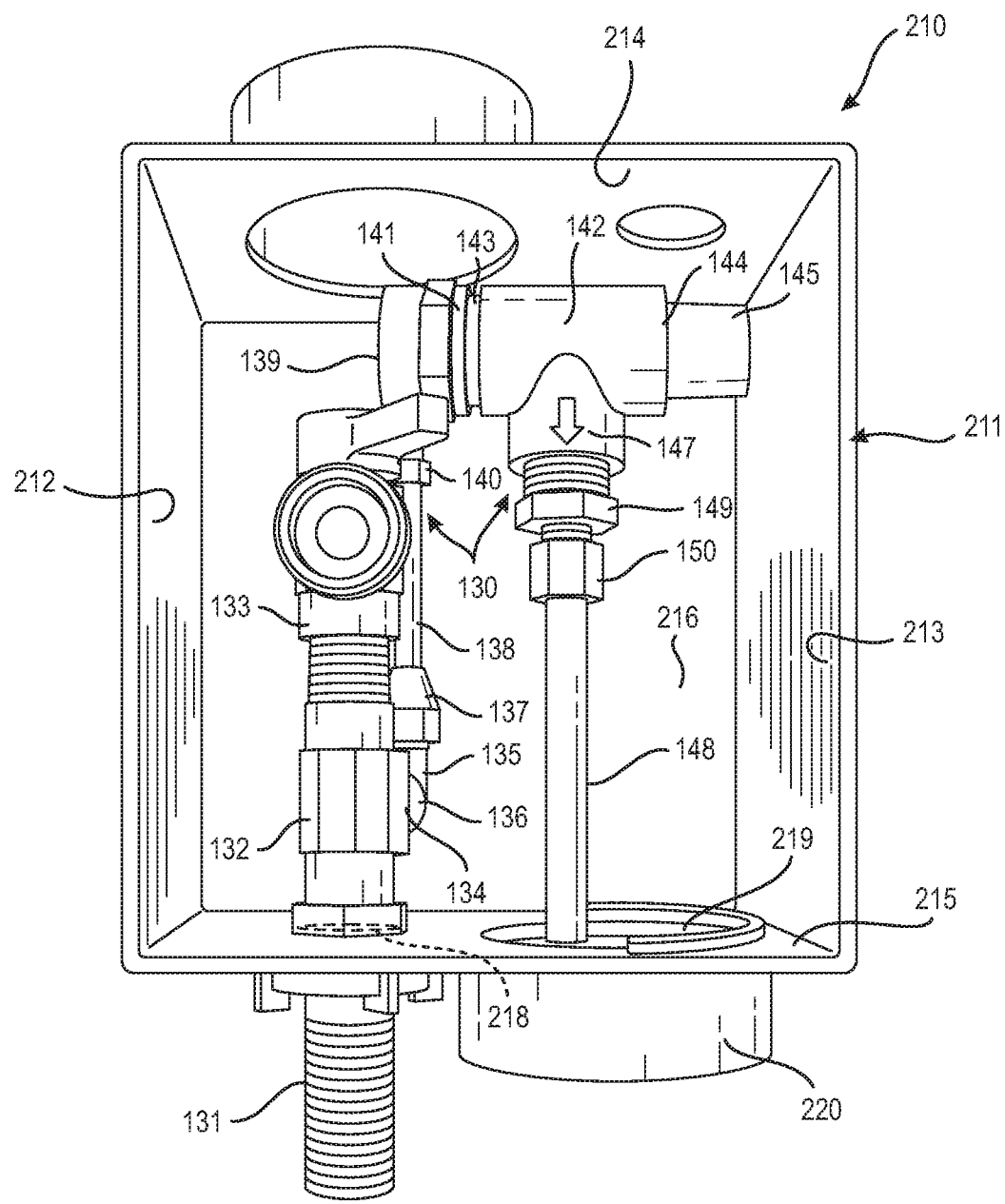
FIG. 3 is a partially exploded perspective view of a thermal expansion protection assembly according to the present invention with the washer box having a single water supply opening and water supply line and the drain opening positioned to laterally to the right of the water supply opening.

A third embodiment of the invention wherein washer box 211 has only a single water supply line and valve is shown in FIG. 3. Thermal expansion protection assembly 210 is of the same general construction as assembly 110 other than with respect to washer box 211 having only a single water supply. Washer box 211 has lateral side walls 212 and 213, top and bottom side walls 214 and 215, rear wall 216, and an open face an open face for making water connections to a washing machine. Washer box 211 has cold water supply opening 218 and drain opening 219, both in bottom wall 215. The underside of drain opening 219 has drain sleeve 220 for connection to a household waste water line which is not shown. The components of pressure relief apparatus 130 in thermal expansion protection assembly 210 are identical to their counterparts in thermal expansion protection assembly 110 and bear the same part numbers.

Figure 4:
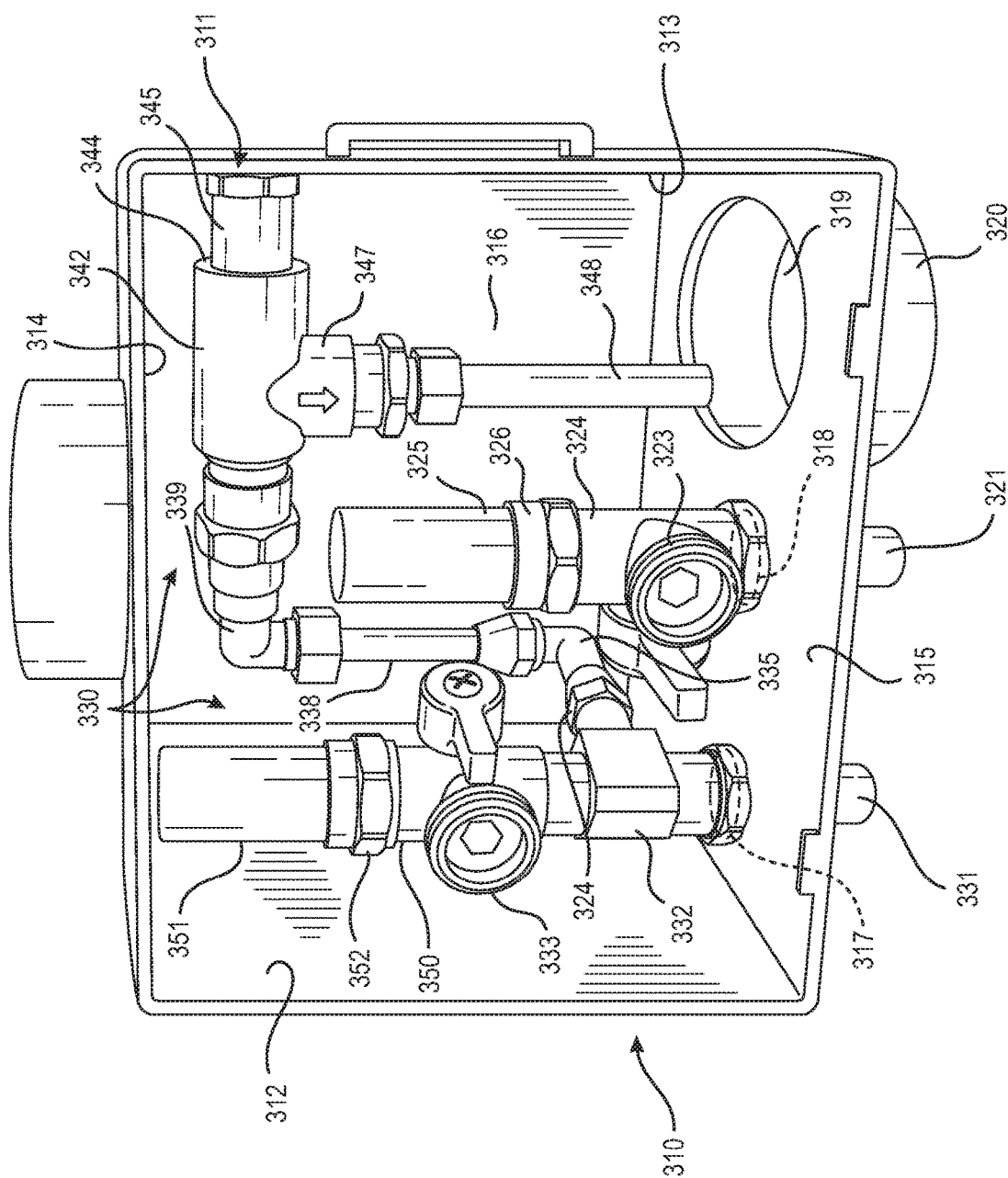
FIG. 4 is a partially exploded perspective view of a thermal expansion protection assembly according to the present invention with the washer box having a drain opening positioned laterally to the right of two adjacent water supply openings, each with a water supply line and an attached washer supply valve having a water hammer arrestor in fluid communication therewith.

A fourth embodiment of the invention featuring water hammer arrestors is depicted in FIG. 4. In this embodiment drain opening 319 is positioned to the right of hot water supply opening 317 and cold water supply opening 318. Thermal expansion protection assembly 330 is of the same general construction as assembly 130 other than with respect to the pressure relief functionality in assembly 330 being connected to the hot water service in this fourth embodiment of the invention and both the cold and hot water lines having water hammer arrestors.

Washer box 311 has lateral side walls 312 and 313, top and bottom side walls 314 and 315, rear wall 316, and an open face for making water connections to a washing machine. Washer box 311 has hot water supply opening 317, cold water supply opening 318 and drain opening 319, all in bottom wall 315. The underside of drain opening 319 has drain sleeve 320 for connection to a household waste water line which is not shown.

Pressure relief apparatus 330 is contained within washer box 310. Apparatus 330 has hot water service connector 331 for connection to the washer hot water supply line which is not shown. Hot water service connector 331 is connected to plumbing tap 332, which in the depicted embodiment is a plumbing tee fitting. The cold water supply to the washing machine is provided by cold water supply valve 323 which is connected to the building water service with cold water service connector 321. Cold water supply valve 323 has cold water valve exit port 324 opposed to cold water service connector 321. Cold water exit port 324 is in fluid communication with water service connector 321 through cold water supply valve 323. Water hammer arrestor 325 is mounted on cold water valve 323 with cold water valve sleeve fitting 326.

The end of plumbing tap 332 which is opposed to water service connector 331 is connected to washer water supply valve 333. Transverse port 334 on plumbing tap 332 connects to tap elbow fitting 335. Elbow fitting 335 directs the flow of water from transverse port 334 in an upward direction. The opposition end of elbow fitting 335 connects to relief valve feed tube 338 which provides a fluid path to relief valve elbow 339. Relief valve elbow 339 connects to relief valve tee 342.

Relief valve tee 342 has relief tee valve port 344 opposed to elbow 339. Relief valve actuator 345 is mounted on relief tee valve port 344. Relief valve actuator 345 closes relief valve transverse port 347 to fluid flow when the pressure in the plumbing system is below the set-point of relief valve actuator 345

When relief valve actuator 345 experiences water pressure in excess of its set-point, it opens and discharges water through relief tee transverse port 347 until the pressure in the plumbing system is reduced to the set-point of relief valve actuator 345. Relief valve transverse port 347 is oriented in a downward direction and is positioned to be above draining opening 319 in washer box 311. Drain line 348 is connected to relief valve transverse port 347. Drain line 348 carries water released by relief valve actuator 345 to drain opening 319.

Hot water supply valve 333 has hot water valve exit port 350 opposed to hot water service connector 331. Hot water exit port 350 is in fluid communication with hot water service connector 331 through hot water supply valve 333. Water hammer arrestor 351 is mounted on hot water valve 333 with hot water valve sleeve fitting 352. The connections of plumbing tap 332, water service connector 331, elbow fitting 335, relief valve feed tube 338, relief valve elbow 339, relief valve tee 342 and relief valve actuator 345 to each other as described above are permanent affixations by welding, brazing, soldering, cement, casting or another permanent affixation means.

Although the invention has been shown and described with respect to certain embodiments, obvious alternations and modifications will occur to others skilled in the art upon reading and understanding the present specification. This invention includes all such equivalent alterations and modifications and is limited only by the scope of the following claims.

What is claimed is:

1. A water pressure relief assembly for washing machines comprising:
    an in-wall mountable washing machine water supply/drain box which defines an enclosure for making water supply and water drain connections to a washing machine, said box having four side walls, a rear wall and an open face for making water connections to a washing machine and said box having at least one water supply opening and at least one water drain opening in said side walls;
    a plumbing tap having first and second opposed fluid entry and exit ports and a third transverse fluid port;
    the entry port of said plumbing tap adapted for mounting in fluid communication on a washing machine water supply line to said box;
    a washing machine supply valve fixedly mounted on and in fluid communication with the exit port of said plumbing tap;
    a water pressure relief valve in fluid communication with the third port of said plumbing tap and fixedly connected to said third port or to a relief valve plumbing line which is in fluid communication with said third port and fixedly connected thereto;
    a drain line in fluid communication with said pressure relief valve and configured to extend from said pressure relief valve to said drain opening in said washing machine supply/drain box; and wherein said plumbing tap, said washing machine supply valve, said pressure relief valve and said drain line comprise a water pressure relief apparatus which is configured to fit within the enclosure defined by the washing machine supply/drain box.

2. The water pressure relief assembly of claim 1 wherein said plumbing tap is a tee connector.

3. The water pressure relief assembly of claim 1 wherein a water hammer arrestor is in fluid communication with said washing machine supply valve.

4. The water pressure relief assembly of claim 2 wherein a water hammer arrestor is in fluid communication with said washing machine supply valve.

5. The water pressure relief assembly of claim 3 wherein the water pressure relief valve is in fluid communication with said plumbing tap through a relief valve plumbing line and said water pressure relief valve is mounted on a relief valve tee connector having two opposed fluid ports and one transverse fluid port and wherein the relief valve plumbing line is fixedly connected to one of the opposed fluid ports of said relief valve tee connector and said water pressure relief valve is fixedly mounted on the opposed fluid port of said relief valve tee connector.

6. The water pressure relief assembly of claim 4 wherein the water pressure relief valve is in fluid communication with said plumbing tap through a relief valve plumbing line and said water pressure relief valve is mounted on a relief valve tee connector having two opposed fluid ports and one transverse fluid port and wherein the relief valve plumbing line is fixedly connected to one of the opposed fluid ports of said relief valve tee connector and said water pressure relief valve is fixedly mounted on the opposed fluid port of said relief valve tee connector.

7. The water pressure relief assembly of claim 1 wherein said washing machine supply/drain box has two water supply openings and one drain opening in the same side wall of said box.

8. The water pressure relief assembly of claim 2 wherein said washing machine supply/drain box has two water supply openings and one drain opening in the same side wall of said box.

9. The water pressure relief assembly of claim 6 wherein said washing machine supply/drain box has two water supply openings and one drain opening in the same side wall of said box.

10. The water pressure relief assembly of claim 7 wherein said drain opening in said washing machine supply/drain box is situated between the two water supply openings.

11. The water pressure relief assembly of claim 8 wherein said drain opening in said washing machine supply/drain box is situated between the two water supply openings.

12. The water pressure relief assembly of claim 9 wherein said drain opening in said washing machine supply/drain box is situated between to the two water supply openings.

13. The water pressure relief assembly of claim 7 wherein said drain opening in said washing machine supply/drain box is situated laterally to the two water supply openings.

14. The water pressure relief assembly of claim 8 wherein said drain opening in said washing machine supply/drain box is situated laterally to the two water supply openings.

15. The water pressure relief assembly of claim 9 wherein said drain opening in said washing machine supply/drain box is situated laterally to the two water supply openings.

16. A water pressure relief assembly for washing machines comprising:

an in-wall mountable washing machine water supply/drain box which defines an enclosure for making water supply and water drain connections to a washing machine, said box having four side walls, a rear wall and an open face for making water connections to a washing machine and said box having at least one water supply opening and at least one water drain opening in said side walls;

a plumbing tap having first and second opposed fluid entry and exit ports and a third transverse fluid port;

the entry port of said plumbing tap adapted for mounting in fluid communication on a washing machine water supply line to said box;

a washing machine supply valve fixedly mounted on and in fluid communication with the exit port of said plumbing tap;

a water pressure relief valve in fluid communication with the third port of said plumbing tap and fixedly connected to said third port or to a conduit which is in fluid communication with said third port and fixedly connected thereto;

said water pressure relief valve having a drain port in fluid communication with said pressure relief valve when said valve is in a pressure relief condition; and wherein said plumbing tap, said washing machine supply valve, said pressure relief valve and said drain port comprise a water pressure relief apparatus which is configured to fit within the enclosure defined by the washing machine supply/drain box.

17. The water pressure relief assembly of claim 16 wherein the drain port on said pressure relief valve is adapted to receive a drain line which is configured to extend from said pressure relief valve to said drain opening in said washing machine supply/drain box.

18. The water pressure relief assembly of claim 16 further comprising a water hammer arrestor in fluid communication with said washing machine supply valve.

19. The water pressure relief assembly of claim 17 further comprising a water hammer arrestor in fluid communication with said washing machine supply valve.

20. The water pressure relief assembly of claim 16 wherein said washing machine supply/drain box has two water supply openings and one drain opening in the same side wall of said box.

21. The water pressure relief assembly of claim 18 wherein said washing machine supply/drain box has two water supply openings and one drain opening in the same side wall of said box.

22. The water pressure relief assembly of claim 20 wherein said drain opening in said washing machine supply/drain box is situated between the two water supply openings.

23. The water pressure relief assembly of claim 21 wherein said drain opening in said washing machine supply/drain box is situated between the two water supply openings.

24. The water pressure relief assembly of claim 20 wherein said drain opening in said washing machine supply/drain box is situated laterally to the two water supply openings.

25. The water pressure relief assembly of claim 21 wherein said drain opening in said washing machine supply/drain box is situated laterally to the two water supply openings.

* * * * *